April 15, 1930.  R. S. KIRK  1,754,629
WEB GUIDING APPARATUS
Filed Nov. 12, 1927   2 Sheets-Sheet 1
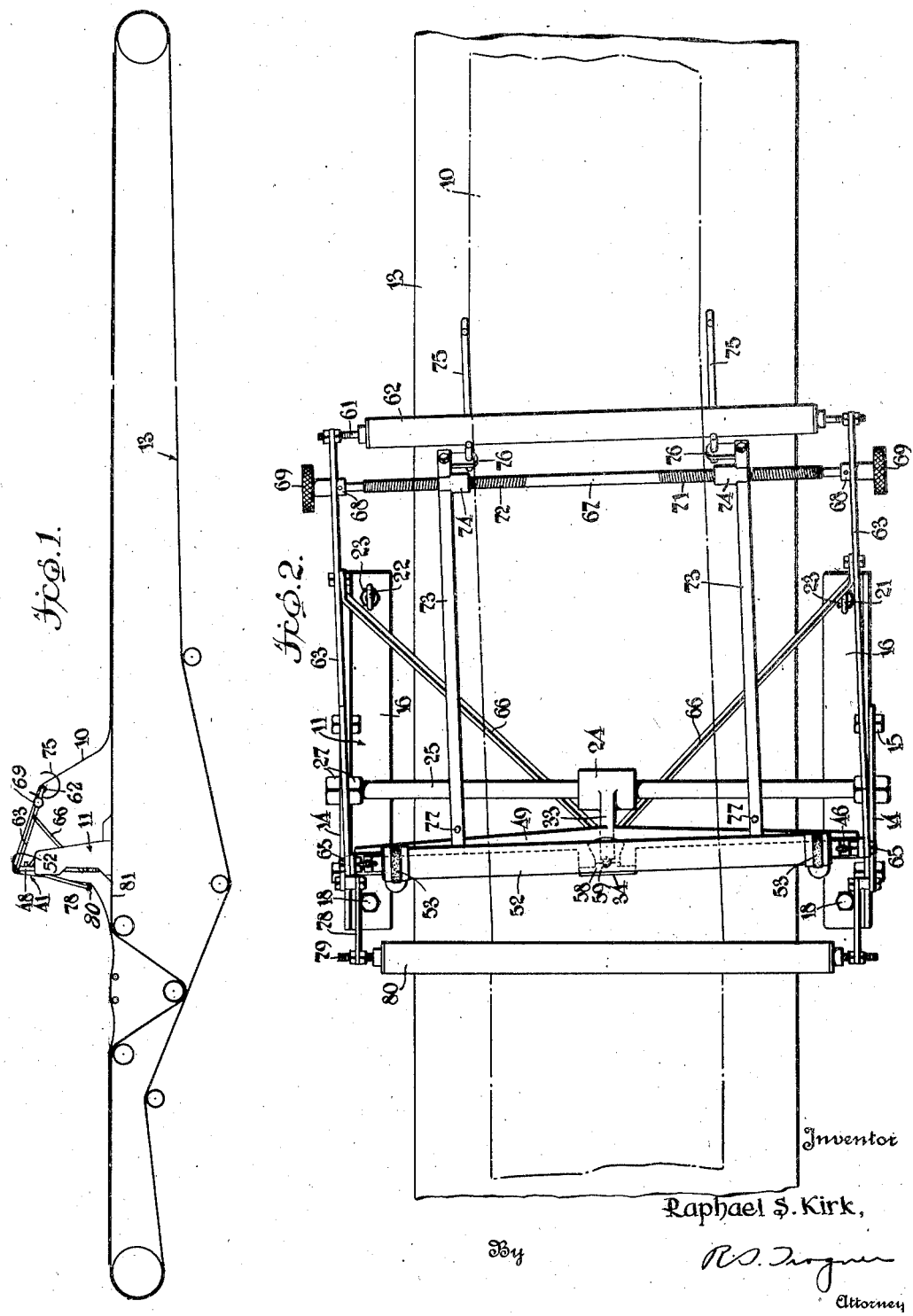
Inventor
Raphael S. Kirk,
By
Attorney

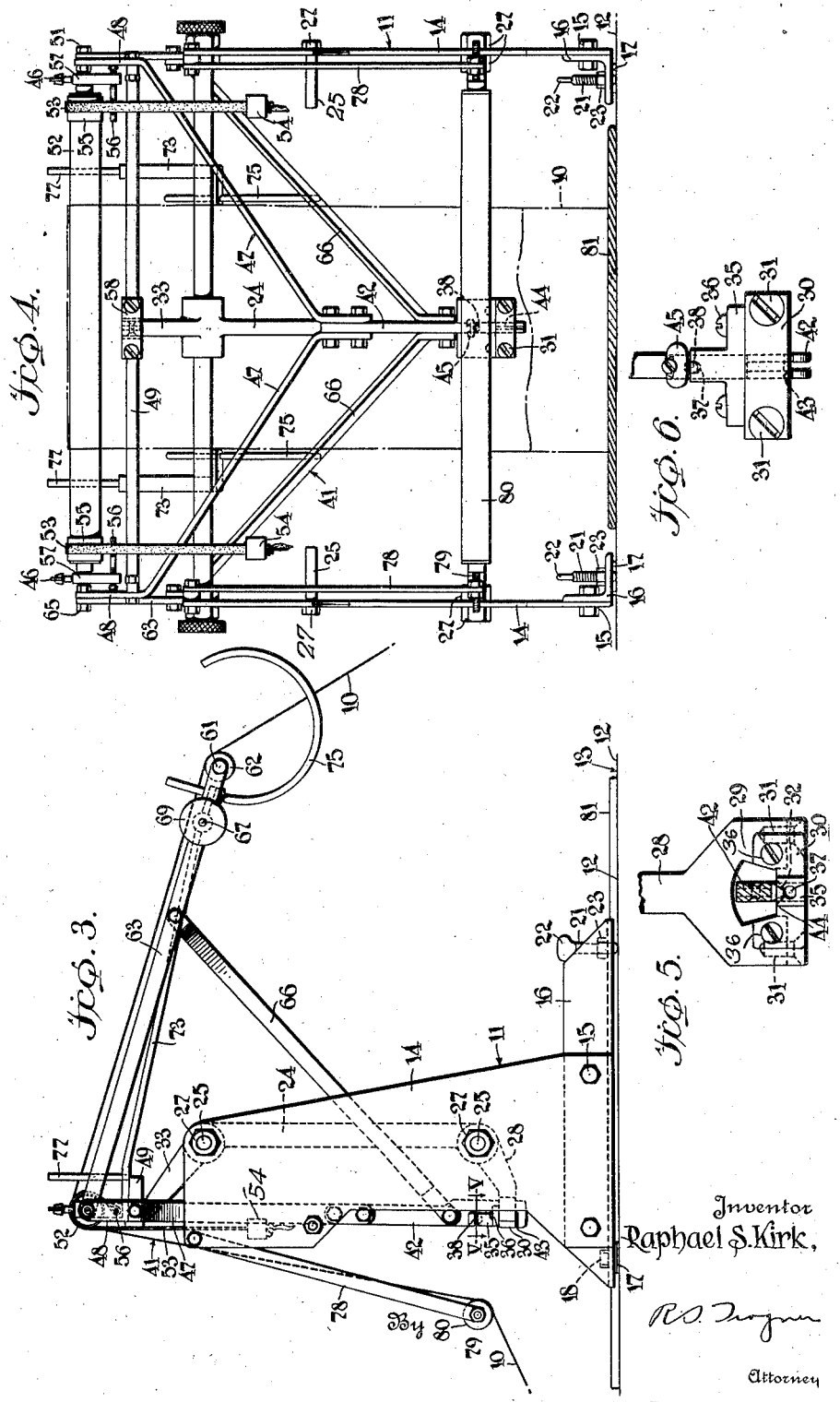

Patented Apr. 15, 1930

1,754,629

UNITED STATES PATENT OFFICE

RAPHAEL S. KIRK, OF AKRON, OHIO, ASSIGNOR TO THE GOODYEAR TIRE & RUBBER COMPANY, OF AKRON, OHIO, A CORPORATION OF OHIO

WEB-GUIDING APPARATUS

Application filed November 12, 1927. Serial No. 232,828.

My invention relates to web guiding apparatus and it has particular relation to an apparatus of the above designated character which shall be especially applicable for centering cord ply stock for pneumatic tires upon a traveling belt preparatory to winding the stock into a roll, within the convolutions of a separating liner.

In accordance with the present practice, strips of ply stock are manually placed upon endless conveyors as they are removed from the bias cutting machine. The bias-cut ends of adjacent strips are joined manually as they are carried forward by the conveyor and the resulting continuous webs are wound, together with the usual liner strips, into rolls for dispensation as required in a subsequent tire building operation.

Since the strips are manually joined, the resulting webs are not straight, and portions thereof are out of alignment with the center of the conveying belt. This condition causes wrinkling of the material as it is wound into rolls and produces unevenly wound rolls from which the web cannot be properly fed. To overcome these difficulties it has been necessary heretofore to station workmen along the conveyor for the sole purpose of manually straightening the web as it approaches the winding apparatus.

One object of my invention is to provide an apparatus which automatically guides and centers a web of material traveling on a conveyor.

Another object of the invention is to provide a simple and efficient apparatus of this character which automatically raises a web of material from the conveyor and returns it thereto in a straightened condition and in alignment with the line of travel of the conveyor.

For a better understanding of the invention reference may now be had to the accompanying drawings forming a part of this specification, of which:

Fig. 1 is a side elevational view, diagrammatically illustrating the device of my invention, operatively associated with a conventional conveying mechanism;

Fig. 2 is a plan view, on a larger scale, of a portion of the apparatus shown in Fig. 1;

Fig. 3 is a side elevational view of the structure shown in Fig. 2;

Fig. 4 is an end elevational view thereof;

Fig. 5 is a fragmentary view partially in cross-section, illustrating in detail a portion of the structure, the view being taken substantially along line V—V of Fig. 3; and Fig. 6 is a front elevational view of the structure shown in Fig. 5.

In the particular embodiment of my invention illustrated in the accompanying drawings, a supporting frame 11 mounted upon a frame 12 of an endless conveyor 13 serves to support the several parts of my device. The frame 11 includes a pair of side-frame members 14 which are bolted, as indicated at 15, to angle iron bases 16.

One end of each base 16 is spaced from the frame 12 by a plurality of washers 17 through which a bolt 18, threaded into the frame 12, passes. The other end of each base 16 is adjustably maintained in spaced relation to the frame by a bolt 21 threaded through the base. The bolt 21 is formed with a winged head 22 to facilitate the manipulation thereof and a nut 23 threaded upon the bolt serves to lock the bolt in adjusted positions.

A frame member 24, of substantially C-shape, is rigidly supported in a vertical position, centrally between the side frame members 14 by spaced rods 25 secured to the respective side-frame members by nuts 27 threaded on the rods and disposed on opposite sides of the frame members 14.

A lower arm 28, constituting a part of the member 24, is forked at its end, as indicated at 29, and a plate 30 is secured in closing relation to the forked end by machine screws 31. The plate 30 is formed centrally of its inner side with a vertically extending groove 32 of V-shape, for a purpose hereinafter to be explained. An upper arm 33, also constituting a part of the member 24, has its end formed to provide a knife edge 34 disposed in vertical alignment with the groove 32 in the plate 30.

A pedestal 35, of T-shape, which is secured to the forked end 29 of the arm 28 by machine screws 36 and overlies the plate 30, is provided in its upper surface with a recess 37 of hemispherical shape for the reception of a steel ball 38 which supports the entire weight of a web supporting and guiding member 41.

As shown, the web supporting and guiding member 41 includes a bar 42 which is formed with a recess 43 extending inwardly from one side thereof. The bar 42 is formed with a knife edge 44 extending into the recess for engagement with the groove 32 in the plate 30, and the upper wall of the recess has an auxiliary bearing piece 45 of suitable metal detachably secured thereto. The piece 45 is formed with a flat under surface for engagement with the steel ball 38, which construction insures a small area of contact and produces minimum resistance to pivotal movement of the member 41. The bar 42 is bolted at its upper end to a pair of upwardly diverging supporting elements 47 having end portions 48 that are bent into parallel relation and are joined by a bar 49 secured at its opposite ends to the respective elements.

A rod 51 journaled in the parallel portions 48 of the elements 47 has a roller 52 rotatably mounted thereon. In order that rotation of the roller 52 may be retarded, one or more straps 53 carrying weights 54 overlie enlarged end portions 55 of the roller. The other ends of the straps 53 are secured to screw-threaded studs 56 threaded into roller positioning elements 57 rotatably and adjustably mounted on and depending from the rod 51. The resistance to rotation of the roller 52, exerted by the straps 53, may be varied by rotation of the elements 57 about the rod 51 to alter the arc of contact of the strap and roller. Set screws 46 threaded into the elements 57 and engaging the rod 51 serve to lock the elements in any desired position. The bar 49 carries a plate 58, similar to plate 30 hereinbefore described, which is formed with a groove 59, of V-shape for coaction with the knife edge 34.

A rod 61 carrying a freely rotatable roller 62 is supported by a pair of links 63 which are pivotally connected at their ends to the respective ends of the rod 51 and are retained thereon by nuts 65 threaded on the rod. Braces 66 secured at their upper ends to the respective links 63 extend downwardly and are bolted to the bar 42 adjacent the lower end thereof. These braces serve to maintain the links 63 in an inclined position, with the roller 62 disposed in a plane below the plane of the roller 52.

A transversely disposed threaded shaft 67 journalled in the links 63 adjacent the roller 62 is maintained in position by means of collars 68. The ends of the shaft 67 are provided with knurled heads 69 which facilitate the manipulation thereof. It will be observed that the convolutions of a threaded portion 71 adjacent one end of the shaft 67 are directed in one direction, while those, as indicated at 72, adjacent the other end, are directed in the opposite direction. Bars 73 resting at one end upon the plate 49 have rigidly secured thereto collars 74 which are interiorly threaded to engage the respective threaded portions on the shaft 67. Curved web guides 75 are secured by adjustable links 76 to the ends of the bars 73. Auxiliary guides 77 are supported by the bars 73 adjacent the ends thereof, which are slidably supported on the plate 49. It will be observed that rotation of the shaft 67 in one direction will cause the bars 73, and consequently the guide elements 75 and 77, to move toward each other, and rotation thereof in the opposite direction causes the guides to move apart.

Links 78 pivotally connected to the respective frame members 14 support at their free ends a shaft 79 upon which a roller 80 is rotatably mounted.

In the operation of the device, a continuous web 10, comprising strips of ply stock that have been manually joined on the conveyor 13, is fed between the guide members 75 over the rollers 62 and 52, beneath the roller 80 and back to the belt 81 of the conveyor 13. The web supporting and guiding element 41 being delicately mounted upon the ball 37 to pivot about a vertical axis defined by the knife edges 34 and 44 automatically swings to the direction from which the stock is being taken from the belt. This movement of the web supporting and guiding element directs the web 10 to the center of the roller 52, regardless of the position thereof prior to its removal from the belt 81. The roller 80, being parallel to the belt 81, tends to maintain the web 10 in this position and exerts the necessary slight tension to prevent wrinkling of the web when rolled into rolls after being returned to the belt 81. The device has been found to operate most efficiently with the pivotal axis of the web supporting and guiding member 41 slightly tilted toward the direction from which the web 10 is drawn. The provision of means for adjusting the height of one end of the angle members 16 makes it possible to vary the inclination of this axis as required.

From the foregoing description it will be apparent that an automatic guiding and centering device for a web of material being conveyed on a belt has been provided, whereby the necessity for stationing an operator at the conveyor to straighten the stock preparatory to the winding operation is obviated.

It is to be understood that the web guiding apparatus hereinbefore described is not limited in its application to guiding continuous webs of material supported by conveyor belts but may be employed independently, if desired, for guiding flexible web material of any character wherein the tension thereon is not sufficiently great to prevent it from traveling under the influence of friction upon a moving surface.

Although I have illustrated only one form which my invention may assume and have described in detail but a single application thereof, it will be apparent to those skilled in the art that the invention is not so limited, but that various minor modifications may be made therein without departing from the spirit of the invention or from the scope of the appended claims.

What I claim is:

1. An apparatus for automatically straightening a continuous web of material carried by a conveyor comprising a frame secured to the conveyor frame and a web supporting and guiding member pivotally mounted on the frame.

2. An apparatus for automatically straightening a continuous web of material carried by a conveyor comprising a frame secured to the conveyor frame, a web supporting and guiding member pivotally mounted on the frame and a roller pivotally connected to the frame for engagement with the web.

3. An apparatus for automatically straightening a continuous web of material carried by a conveyor comprising a frame secured to the conveyor frame and a web supporting and guiding member mounted on the frame to pivot about a vertical axis.

4. An apparatus for automatically straightening a continuous web of material carried by a conveyor comprising a frame secured to the conveyor frame and a web supporting and guiding member mounted on the frame to pivot about a vertical axis disposed in alignment with the transverse center of the conveyor.

5. An apparatus for automatically straightening a continuous web of material carried by a conveyor comprising a frame secured to the conveyor frame and a web supporting and guiding member mounted on the frame to pivot about a vertical axis disposed in alignment with and directly above the transverse center of the conveyor.

6. An apparatus for automatically straightening a continuous web of material carried by a conveyor comprising a frame secured to the conveyor frame, a web supporting and guiding member mounted on the frame to pivot about a vertical axis, and means on the member whereby pivotal movement thereof is governed by the direction of travel of the web thereover.

7. An apparatus for automatically straightening a continuous web carried by a conveyor comprising a frame secured to the conveyor frame, a web supporting member pivotally mounted on the frame, and means on the member whereby a web passing thereover governs movement of the member to cause return of the web to the conveyor in a straightened condition.

8. An apparatus for automatically straightening a web of material carried by a conveyor comprising a frame secured to the conveyor frame, and a web supporting and guiding member pivotally mounted on the frame, said member including a pair of spaced rollers.

9. An apparatus for automatically straightening a web of material carried by a conveyor comprising a frame secured to the conveyor frame, a web supporting and guiding member pivotally mounted on the frame, said member including a pair of spaced rollers, and means for retarding rotation of one of the rollers.

10. An apparatus for automatically straightening a web of material carried by a conveyor comprising a frame secured to the conveyor frame, a web supporting and guiding member pivotally mounted on the frame, said member including a pair of spaced rollers, means for retarding rotation of one of the rollers, and adjustable web guides disposed adjacent the ends of the rollers.

11. An apparatus for automatically straightening a web of material carried by the conveyor comprising a frame secured to the conveyor frame, a web supporting and guiding member mounted on the frame to pivot about a substantially vertical axis and means for varying the position of the frame with respect to the conveyor frame to vary the inclination of the axis.

12. An apparatus for automatically centering a web of material carried by a conveyor comprising a supporting frame secured to the conveyor frame, a roller pivotally connected to the frame, and a web supporting and guiding member pivotally mounted on the frame, said member including a pair of spaced rollers.

13. An apparatus for centering a web of pneumatic tire cord ply stock which has been previously spliced into continuous strip upon a conveyor comprising a frame secured to the conveyor frame and a web supporting and guiding member pivotally mounted on the frame, said pivotal mounting comprising a ball supporting the entire weight of the member and a pair of knife edge connections between the frame and member.

14. A web guiding apparatus comprising an elongate mechanism for movably supporting a substantial portion of a continuous web, and means for pivotally mounting the mechanism adjacent one end thereof.

15. A web guiding apparatus comprising an elongate mechanism for movably supporting a substantial portion of a continuous web, and means for pivotally mounting the mechanism adjacent one end thereof at an acute angle to the horizontal plane in the general direction from which the web approaches the mechanism.

16. A web guiding apparatus comprising an elongate frame having a parallel pair of rollers rotatably mounted adjacent opposite ends thereof and means for pivotally supporting the frame adjacent one of the rollers to rotate about an axis intersecting the plane of the frame.

17. A web guiding apparatus comprising an elongate frame having a pair of rollers rotatably mounted adjacent the opposite ends thereof, and means for pivotally supporting the frame adjacent one of the rollers and intermediate the opposite ends thereof.

18. A web guiding apparatus comprising an elongate frame having a pair of rollers rotatably mounted adjacent the opposite ends thereof, means for rotatably supporting the frame adjacent one of the rollers and intermediate the opposite ends thereof, and a spaced pair of guiding arms projecting transversely to the roller adjacent the opposite end of the frame.

19. The combination with a moving conveyor, of a web supporting mechanism pivotally mounted thereon for receiving the web from variable positions upon the conveyor and discharging it in a uniform position thereon.

20. The combination with a moving conveyor, of a web supporting mechanism pivotally mounted adjacent thereto upon an axis disposed transversely to the conveyor and intersecting the latter.

In witness whereof, I have hereunto signed my name at Akron, in the county of Summit, and State of Ohio, this 11th day of November, 1927.

RAPHAEL S. KIRK.